(12) United States Patent
Maeng (10) Patent No.: US 11,341,483 B1
(45) Date of Patent: May 24, 2022

(54) ENHANCED SECURITY FOR DIGITAL WALLETS IN MULTIPLE DEVICES

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 104 days.

(21) Appl. No.: 16/943,225

(22) Filed: Jul. 30, 2020

Related U.S. Application Data (63) Continuation of application No. 15/161,505, filed on May 23, 2016, now Pat. No. 10,748,140.

(51) Int. Cl.
*G06Q 20/36* (2012.01)
*H04W 4/80* (2018.01)
*G06Q 20/40* (2012.01)

(52) U.S. Cl.
CPC ..... *G06Q 20/3674* (2013.01); *G06Q 20/3672* (2013.01); *G06Q 20/4012* (2013.01); *G06Q 20/40145* (2013.01); *H04W 4/80* (2018.02)

(58) Field of Classification Search
CPC .......... G06Q 20/3674; G06Q 20/3672; G06Q 20/4012; G06Q 20/40145; H04W 4/80
USPC ....................................................... 235/375
See application file for complete search history.

(56) References Cited

U.S. PATENT DOCUMENTS

| | | | |
|---|---|---|---|
| 9,112,701 B2 | 8/2015 | Sano et al. | |
| 9,847,999 B2 * | 12/2017 | Van Os | G06F 21/35 |
| 10,748,140 B1 | 8/2020 | Maeng | |
| 2015/0035643 A1 | 2/2015 | Kursun | |
| 2015/0074800 A1 | 3/2015 | Farraro | |
| 2016/0034887 A1 * | 2/2016 | Lee | G06F 1/163 705/39 |
| 2017/0061424 A1 * | 3/2017 | Dent | G06Q 20/3224 |
| 2018/0005227 A1 * | 1/2018 | Sandelov | G06K 19/06206 |

OTHER PUBLICATIONS

"U.S. Appl. No. 15/161,505, Advisory Action dated Aug. 22, 2019", 3 pgs.
"U.S. Appl. No. 15/161,505, Final Office Action dated Jun. 12, 2019", 9 pgs.

(Continued)

*Primary Examiner* — Michael G Lee
*Assistant Examiner* — David Tardif
(74) *Attorney, Agent, or Firm* — Schwegman Lundberg & Woessner, P.A.

(57) ABSTRACT

Various examples are directed to computer-implemented systems and methods for enhanced security for mobile wallets in multiple devices. The method includes using a wearable computing device to submit an account payment transaction at a point of sale device. The point of sale device sends a transaction request message requesting authorization for the account payment transaction on an account of a user of the wearable computing device. An encrypted authentication token is received at a mobile computing device from a mobile wallet provider in response to the transaction request message, and the token is sent to the wearable computing device. The wearable computing device receives the token and forwards it to the mobile wallet provider. An authorization message is received from the mobile wallet provider after the token is verified.

20 Claims, 5 Drawing Sheets

(56) References Cited

OTHER PUBLICATIONS

"U.S. Appl. No. 15/161,505, Non Final Office Action dated Feb. 25, 2019", 7 pgs.
"U.S. Appl. No. 15/161,505, Non Final Office Action dated Oct. 3, 2019".
"U.S. Appl. No. 15/161,505, Notice of Allowance dated Apr. 17, 2020".
"U.S. Appl. No. 15/161,505, Response filed Jan. 2, 20 to Non Final Office Action dated Oct. 3, 2019".
"U.S. Appl. No. 15/161,505, Response filed May 23, 19 to Non Final Office Action dated Feb. 25, 2019", 9 pgs.
"U.S. Appl. No. 15/161,505, Response filed Aug. 6, 19 to Final Office Action dated Jun. 12, 2019", 10 pgs.

\* cited by examiner

ENHANCED SECURITY FOR DIGITAL WALLETS IN MULTIPLE DEVICES

CROSS-REFERENCE TO RELATED APPLICATIONS

This application is a continuation of prior application Ser. No. 15/161,505, filed on May 23, 2016, which is incorporated by reference herein in its entirety.

TECHNICAL FIELD

Embodiments described herein generally relate to mobile or digital wallets and, for example and without limitation, to systems and methods for enhanced security for mobile wallets in multiple devices.

BACKGROUND

Mobile or digital wallets can allow consumers to make payments for products and services with mobile devices such as phones or watches instead of cash, credit cards, or checks. Using an antenna in the mobile device, mobile wallets can communicate with contactless readers using radio frequency identification (RFID) such as near field communication (NFC). Mobile wallets can allow consumers to make secure payments in a relatively quick manner by placing their mobile devices near contactless readers at stores. Mobile wallets can also be used to make purchases within applications on mobile devices and over the Internet.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

A user can utilize a mobile wallet to make a payment to a payee. In some examples, the payment is part of a purchase transaction. For example, the payee can be a grocery store, department store, or other vendor of goods or services. The mobile wallet application can be executed by one or more mobile computing devices, in various examples. In some examples, the mobile wallet makes the payment by communicating with a point-of-sale (POS) device of the payee. The POS device can be a cash register, card reader, or other suitable device for receiving payment information. The mobile wallet can provide the POS device with account credentials for a mobile wallet account. In various examples, the mobile wallet account is an account of the user from which the payment will be made such as, for example, a credit card account, a debit account, a checking accounts, etc.

As mobile wallets gain popularity, there is a need to provide proper security for mobile wallet transactions. The present disclosure describes systems and methods for providing security for processing payments with mobile wallets in multiple devices. Electronic payment applications such as mobile wallets can reside in two companion mobile devices such as a smartphone and a smart watch. Having more devices with payment capability increases security risks. To improve the security of mobile wallet use with multiple devices, there is a need for enhancing security of a payment process without forcing users to take additional action.

A device such as a smartphone communicates with a companion device such as smart watch over wireless media such as Bluetooth or near field communication (NFC). Either device can be used to make payments with a payment element such as credit/debit card in the mobile/digital wallet. When a POS device requests an authorization of a payment submitted by a first device to the issuer of a payment account, the issuer requests the mobile wallet provider authenticate the first or paying device, in various embodiments. In various embodiments, the mobile wallet provider sends a security token to a second or companion device and verifies if the token is received from the first device. If the verification fails, the mobile wallet can use a secondary method, such as personal identification number (PIN) or biometric signature to verify the authenticity of the paying device, in various embodiments.

Figure 1:
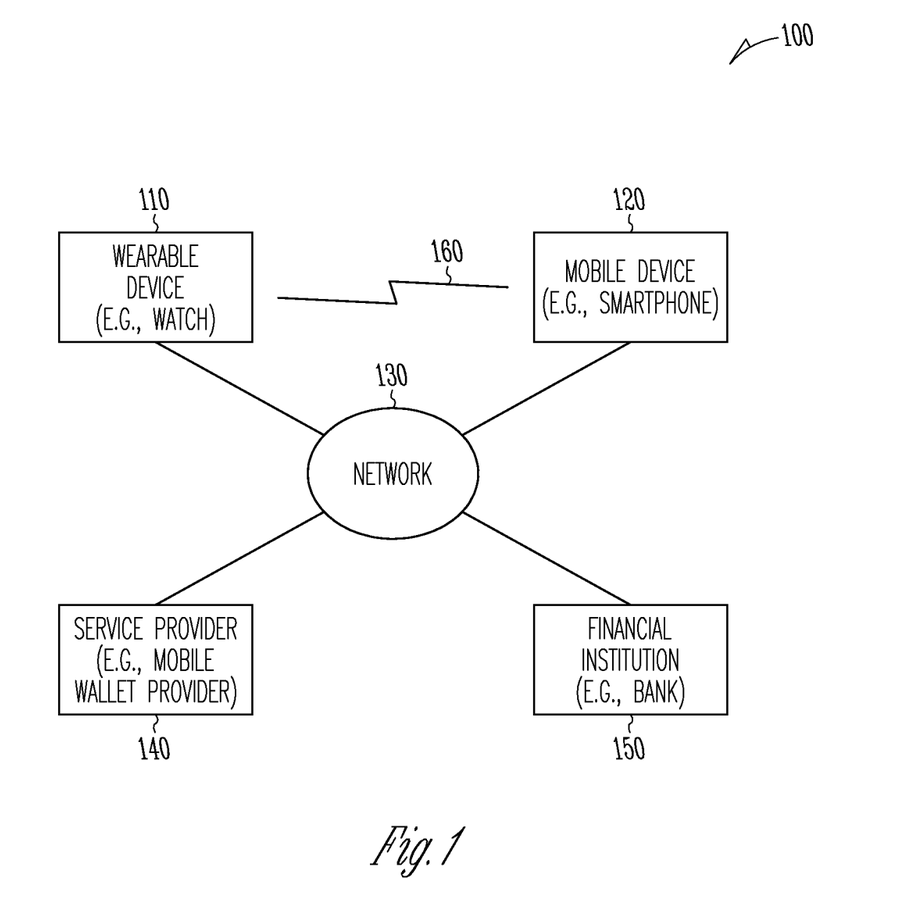
FIG. 1 illustrates an example of a system for providing enhanced security for mobile wallets in multiple devices.

FIG. 1 illustrates an exemplary infrastructure for providing enhanced security for digital wallets in multiple devices. The infrastructure comprises a wearable device (e.g., smart watch), a mobile device (e.g., smartphone), a service provider 140, and a financial institution 150, a network 130, and a device network 160. The mobile device 120 is a mobile computing device such as smartphone, tablet computer, or other portable computing device. The wearable device 100 is a companion device of the mobile device 120. Exemplary mobile devices and companion devices are Apple iPhone and Apple watch and Samsung Galaxy smartphone and Samsung Gear S2 smart watch. The mobile device 120 and the companion device 110 include a payment application such as digital/mobile wallet, in various embodiments. The mobile wallet allows an individual to make electronic commerce transactions, which can include purchasing items and making payments. The mobile wallet comprises payment elements (e.g., credit card, debit card, and bank account) and non-payment elements (e.g., identifications and membership cards).

Exemplary mobile wallet applications include Apple Pay, PayPal, Samsung Pay, and Starbucks App. The service provider 140 is the provider of mobile wallet in the wearable device 110 and mobile device 120 and services associated with the mobile wallet, in various embodiments. Exemplary service providers are Apple, PayPal, Samsung, and Starbucks. The financial institution 150 is an organization that provides a payment account to the mobile wallet, in various embodiments. Exemplary financial institutions are bank, credit/debit card companies, and the like.

The network 130 represents a virtual network which provides communication between entities 110, 120, 140 and 150. The network 130 can comprise Internet, LAN, Wi-Fi, home network, cellular network, NFC, and other types of networks, in various embodiments. The device network 160 is a wireless communication network between the mobile device 120 and wearable device only. Exemplary wireless networks 160 are a Local area network (LAN), Personal Area Network (PAN), and body area network (BAN). The wireless network 160 can use Bluetooth, Near Filed Communication (NFC), Wi-Fi, ZigBee, or other wireless technology, in various embodiments.

A mobile device owner (user) owns a mobile wallet 120 and the wearable device 110. The wearable device 110 is a companion device of the mobile device 120, in various embodiments. For instance, a smart watch 110 is a companion device of a smartphone 120. The mobile device 120 includes a mobile wallet application and allows the user to make payments with mobile wallet elements (e.g., credit card, debit card, or bank account). The mobile device 120 communicates with the wearable device 110 over a wireless network such as Bluetooth Low Energy (BLE) network. Users of the mobile device 120 with mobile wallet can use the wearable device 110 to make payments instead of using the mobile wallet, in various embodiments. There can be more than one companion devices that can communicate with the mobile device 120 over the wireless device network 160.

Since mobile device owners have two devices in the described example, it is easier to lose one of them. The present invention provides enhanced security to prevent any unauthorized use of a mobile device or a companion device in making payments.

Figure 2:
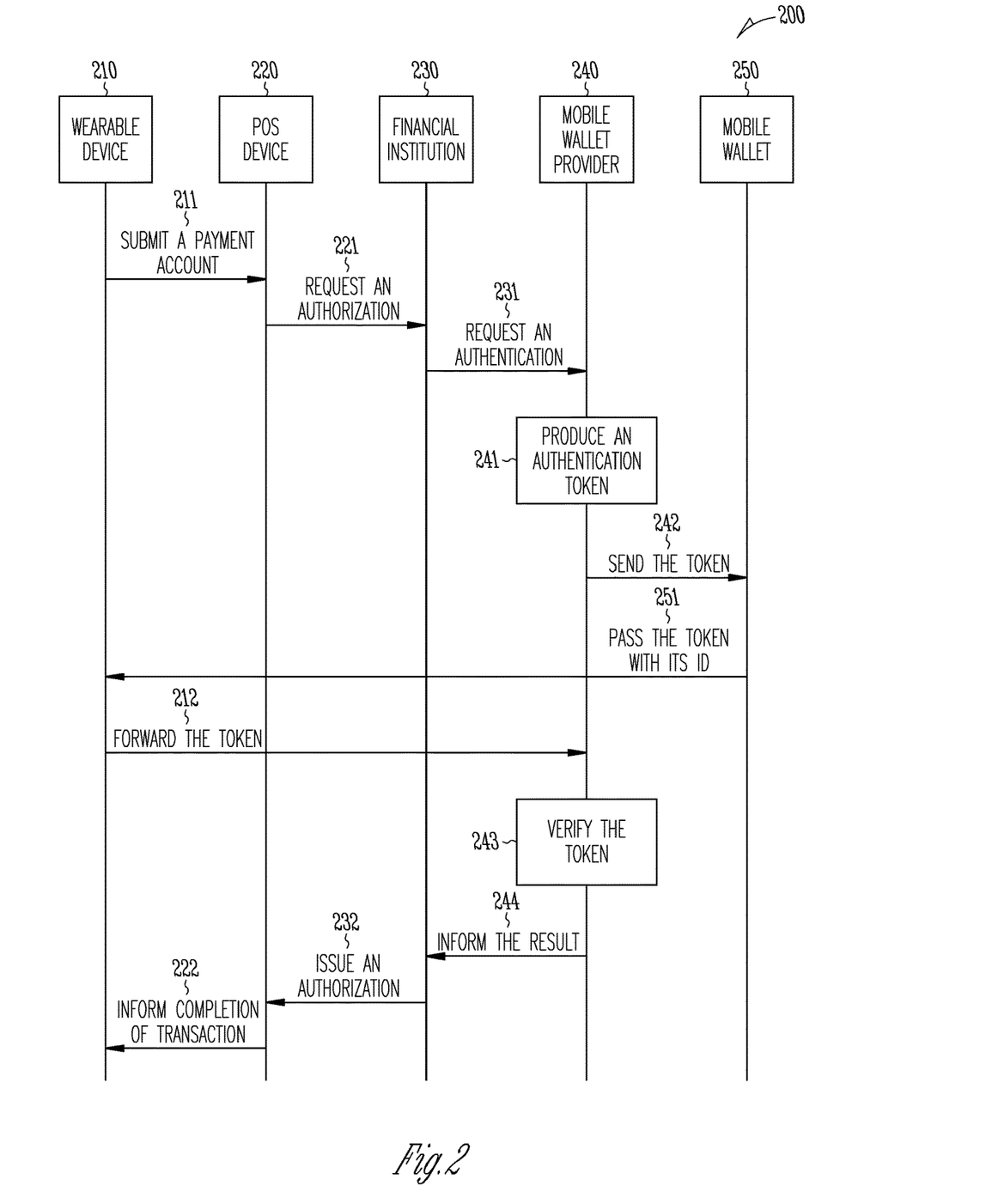
FIG. 2 illustrates a flowchart of an example method of providing enhanced security for mobile wallets with a companion device.

FIG. 2 illustrates an exemplary flowchart of providing enhanced security for mobile wallets with companion device, according to various embodiments. A user uses a wearable device 210 (e.g., smart watch) and submits a payment account transaction (such as by NFC communication) to purchase a product at operation 211. The POS device 220 at the merchant requests an authorization of the payment at operation 221 to the financial institution (i.e., issuer) via a processor/acquirer (not shown), in various embodiments. In various embodiments, the financial institution 230 requests an authentication of the payment by the wearable device to the mobile wallet provider 240 at operation 231. The mobile wallet provider 240 is the supplier of the companion application in the wearable device 210 for payments. In various embodiments, the mobile wallet provider 240 produces an authentication token at operation 241. The authentication token is an encrypted unique identifier, in an embodiment.

The mobile wallet provider sends the authentication token to the mobile wallet at operation 242, according to various embodiments, and the mobile wallet passes the token with its ID to the wearable device at operation 242. If the wearable device 210 is within the range of the wireless network 160 of the mobile device with the mobile wallet, the wearable device can receive the token with the ID. If the wearable device is not in the range, it does not receive the token with the ID. The wearable device forwards the token with the ID to the mobile wallet provider at operation 212, in various embodiments.

The mobile wallet provider verifies the authenticity of the token and the ID at operation 243, by matching the token and ID for example. According to various embodiments, the mobile wallet provider informs the result of verification of the authenticity to the financial institution at operation 244. If the authenticity is verified, the financial institution issues an authorization if the account has a sufficient balance to cover the transaction at operation 232. In various embodiments, the POS device accepts the payment and informs completion of transaction to the wearable device at operation 222.

If the authentication fails, the mobile wallet provider can send an alternative way to verify the authenticity of using the companion device for payment, in an embodiment. An alternative way can be entering a PIN or biometric signature in the paying device. Similarly, when a user uses a mobile device to make a payment, the mobile wallet provider uses the same procedure to authenticate the payment via the companion device. If both devices are located within the range of the wireless network 160, the authentication process is transparent to the user. In various embodiments, the mobile wallet application sends an identification indicator with the token to the wearable computing device. The mobile wallet application receives the identification indicator and the token and forwards the identification indicator and the token to the mobile wallet provider, in an embodiment. In various embodiments, the mobile wallet application receives a completion indicator for the account payment from the POS device if the account payment is accepted.

In one embodiment, the financial institution can perform the function of checking the authenticity performed by the mobile wallet provider. Since there can be many payments accounts in a mobile wallet, it would be desirable for the mobile wallet to consolidate and check the authenticity instead of leaving it to each financial institution. In various embodiments, a user can select whether to institute the security enhancement of the present subject matter. In further embodiments, the security enhancement of the present subject matter can be activated based on location, using a GPS signal from one or more of the mobile computing device and the wearable computing device. In addition, the user can set geographical parameters for activation of the security enhancement based on location of one or more of the mobile computing device and the wearable computing device, in various embodiments. In one embodiment, a timer is used to ensure the token is received within a programmable time period. The preferences described above can be set by the user by using one or more user interface elements provided by the mobile wallet application.

In one embodiment, the financial institution 230 can initiate verification when it receives payment authorization requests from a watch or other wearable device and the geographic location of the user's recent transaction with a main device (i.e., mobile wallet) is different. In general, the financial institution initiates a verification if it cannot confirm that the wearable device and the mobile wallet are closely located geographically.

In an alternative embodiment, a mobile wallet can be configured such that each transaction with a wearable device should be verified if the main device is not in contact with the wearable device via the device network 160. In some cases, the watch has a location identifier such as a GPS in it. When the wearable device is not in communication with the main device, or the wearable device is not in the geographic region specified by the user, the wearable device can initiate the verification when it is used for making payment. Some wearable devices can access a network such as a Wi-Fi or cellular network independently from the mobile device, in which case the mobile wallet use can be verified through the wearable device. If the mobile wallet submits a payment, the financial institution verifies the mobile wallet through the wearable device, in various embodiments.

Figure 3:
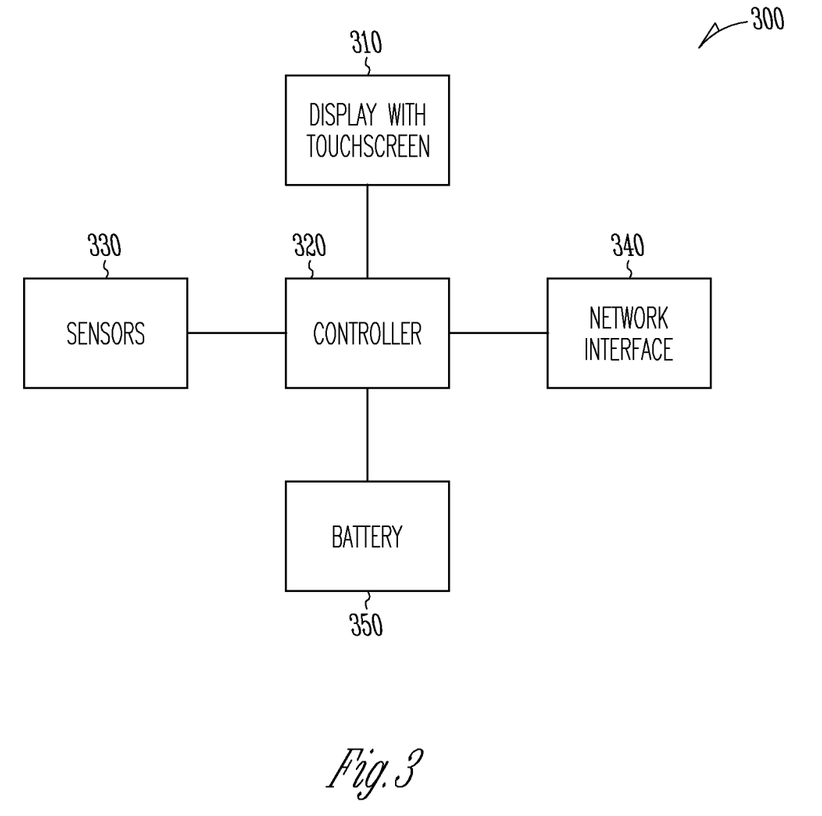
FIG. 3 illustrates an example embodiment of a wearable or companion device used to provide enhanced security for mobile wallets.

FIG. 3 illustrates an embodiment of wearable computing device 300 accompanying the mobile device. In various embodiments, the wearable computing device 300 includes a smart watch. In the depicted embodiment, the wearable computing device 300 includes a display with a touchscreen 310 interfaced with a controller or processor 320. The controller 320 is electrically connected to one or more sensors 330, a network interface 340, and a battery 350 to supply power to the wearable computing device 300, in various embodiments.

Figure 4:
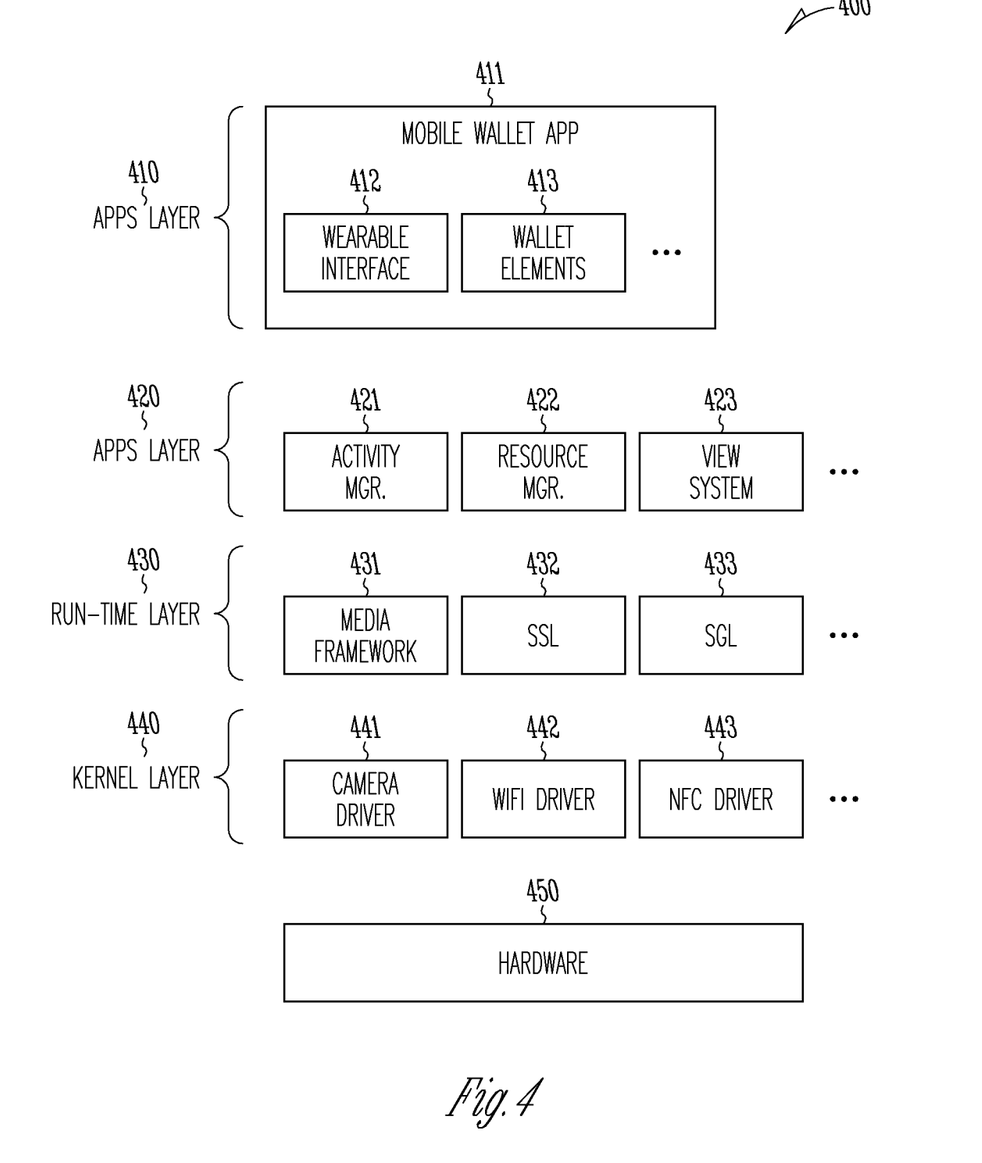
FIG. 4 illustrates an example embodiment of a mobile device used to provide enhanced security for mobile wallets.

FIG. 4 illustrates an embodiment of a mobile computing device 400 with a mobile wallet application 411. In various embodiments, the mobile computing device 400 includes a cellular telephone, such as a smart phone. The depicted embodiment illustrates one example of software architecture executed on hardware 450, including one or more processors of the mobile computing device 400. FIG. 4 is merely a non-limiting example of a software architecture and many other architectures can be implemented to facilitate the functionality described herein.

The representative hardware layer 450 comprises one or more processing units having associated executable instructions. Executable instructions represent the executable instructions of the software architecture, including implementation of the methods, modules, and components of the present subject matter. Hardware layer 450 also includes memory and/or storage modules, which also have executable instructions.

In the example architecture of FIG. 4, the software can be conceptualized as a stack of layers where each layer provides particular functionality. For example, the software can include layers such as an operating system, libraries, frameworks/middleware, applications and presentation layer. Other software architectures can include additional or different layers. The operating system can manage hardware resources and provide common services. The overall system can include, for example, a kernel layer 440, run-time layer 430, application framework layer 420 and application layer 410. The kernel layer 440 can act as an abstraction layer between the hardware and the other software layers. For example, the kernel layer 440 can be responsible for memory management, processor management (e.g., scheduling), component management, networking, security settings, and so on. The drivers can be responsible for controlling or interfacing with the underlying hardware. For instance, the drivers can include display drivers, camera drivers 441, Bluetooth® drivers, flash memory drivers, serial communication drivers (e.g., Universal Serial Bus (USB) drivers), Wi-Fi® drivers 442, NFC drivers 443, audio drivers, power management drivers, and so forth depending on the hardware configuration.

The run-time layer 430 can include a media framework 431, a secure sockets layer (SSL) 432 and a secure group layer (SGL) 433, in various embodiments. The application framework layer 420 can include an activity manager 421, a resource manager 422, and a view system application 423, in various embodiments. The application layer 410 can include built-in applications and/or third party applications. Examples of representative built-in applications can include, but are not limited to, a contacts application, a browser application, a book reader application, a location application, a media application, a messaging application, and/or a game application. Third party applications can include any of the built in applications as well as a broad assortment of other applications. In a specific example, the third party application (e.g., an application developed using the Android™ or iOS™ software development kit (SDK) by an entity other than the vendor of the particular platform) can be mobile software running on a mobile operating system such as iOS™, Android™, Windows® Phone, or other mobile operating systems. In this example, the third party application can invoke application programming interface (API) calls provided by the mobile operating system such as operating system to facilitate functionality described herein. A mobile wallet application 411 can implement the functionality of the mobile wallet described herein. The mobile wallet application can be a built-in or third party application, and can include a wearable interface 412 and wallet elements 413 in various embodiments.

The applications 410 can utilize built in operating system functions (e.g., kernel, services and/or drivers), libraries, frameworks and middleware to create user interfaces to interact with users of the system. Alternatively, or additionally, in some systems interactions with a user can occur through a presentation layer. In these systems, the application/module "logic" can be separated from the aspects of the application/module that interact with a user.

The mobile wallet provider can generate and maintain a single encryption key used to encrypt and decrypt all messages, or can have a dedicated key per block of time (e.g., per week, or per day, based on the date of the symbol generation), or can have a dedicated key per user, or per account. The terms "encode" and "decode," as used herein, refer, respectively, to the process of translating data into and out of a security symbol format. The terms "encryption" and "decryption," as used herein, refer to cryptographically enciphering and deciphering data (e.g., with a cryptographic key). The term "cypher" refers to an algorithm used to encrypt or decrypt data. Many known cyphers (e.g., symmetric and asymmetric encryption, public key encryption) use one or more keys to encrypt decrypt data. The term "encrypted" can be used to refer to data after it has been encrypted by the cypher.

Figure 5:
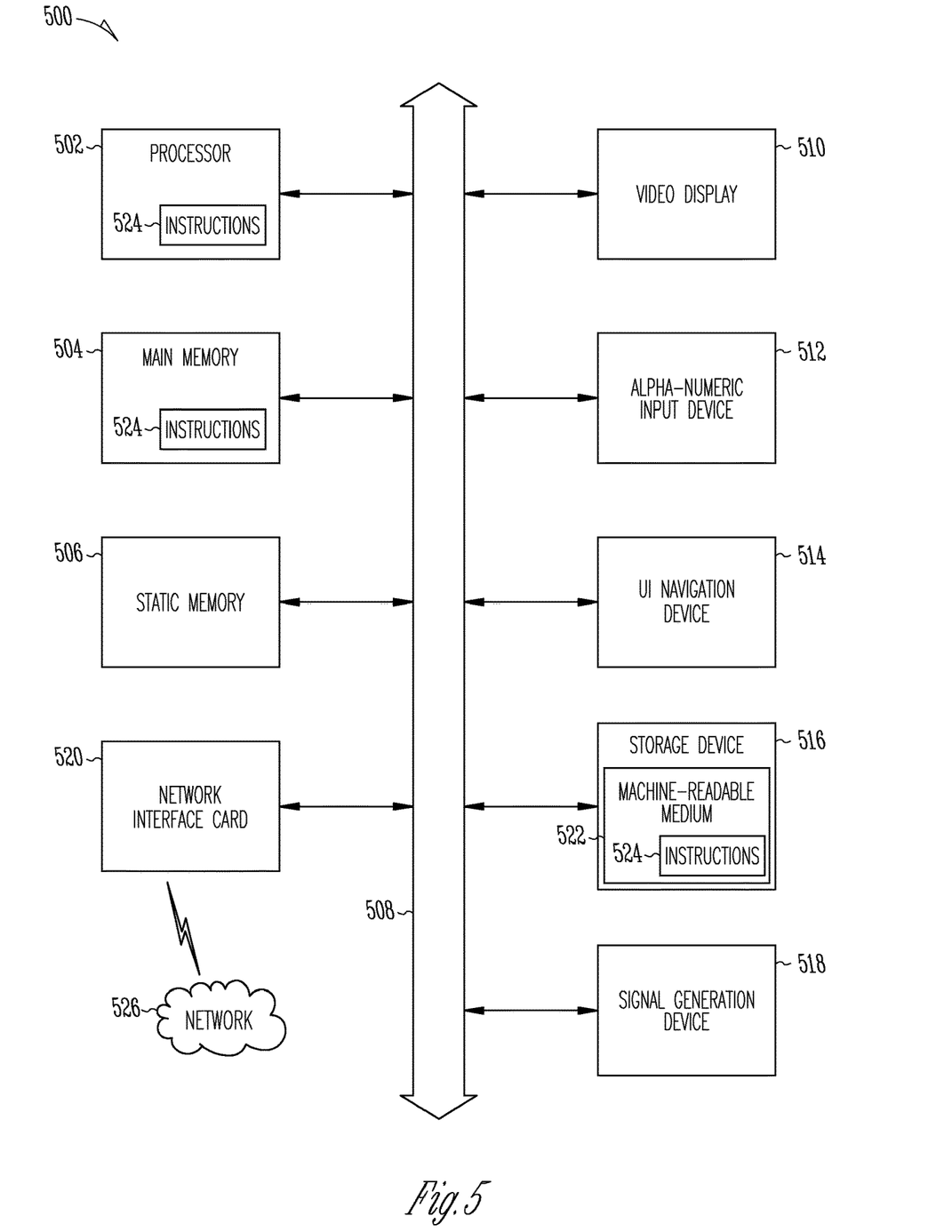
FIG. 5 is a block diagram of a machine in the example form of a computer system within which a set of instructions can be executed, for causing the machine to perform any one or more of the methodologies discussed herein.

FIG. 5 is a block diagram illustrating a machine in the example form of a computer system 500, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile or cellular telephone such as a smart phone, a wearable device such as a smart watch, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions (e.g., instructions 524) for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including, but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 6G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A computer-implemented method comprising:
    submitting, by a mobile wallet application executing at a wearable computing device of a user, an account payment transaction at a point of sale device;
    sending, by a financial institution application executing at the point of sale device, a transaction request message requesting authorization for the account payment transaction on an account of the user;
    receiving, by the mobile wallet application executing at a mobile computing device, an encrypted authentication token from a mobile wallet provider in response to the transaction request message;
    sending, by the mobile wallet application executing at the mobile computing device, the token to the wearable computing device;
    receiving, by the mobile wallet application executing at the wearable computing device, the token and forwarding the token to the mobile wallet provider; and
    receiving, by the financial institution application, an authorization message from the mobile wallet provider after the token is verified.

2. The computer-implemented method of claim 1, further comprising:
    sending, by the mobile wallet application executing at the mobile computing device, an identification indicator with the token to the wearable computing device.

3. The computer-implemented method of claim 2, further comprising:
    receiving, by the mobile wallet application executing at the wearable computing device, the identification indicator and the token and forwarding the identification indicator and the token to the mobile wallet provider.

4. The computer-implemented method of claim 1, further comprising:
    producing, by the mobile wallet application executing at the mobile computing device, the token including a unique identifier for the transaction.

5. The computer-implemented method of claim 1, further comprising:
    sending, by the financial institution application, an authorization of payment if the authorization message is received and if the account of the user includes a balance equal to or greater than the account payment.

6. The computer-implemented method of claim 1, further comprising:
    receiving, by the mobile wallet application executing at the wearable computing device, a completion indicator for the account payment from the point of sale device if the account payment is accepted.

7. The computer-implemented method of claim 1, further comprising:
    if the token is not received, sending, by the mobile wallet application executing at the mobile computing device, an alternative authentication request to the wearable computing device.

8. The computer-implemented method of claim 7, wherein the sending the alternative authentication request includes sending a request for a personal identification number (PIN) to the wearable computing device.

9. The computer-implemented method of claim 7, wherein the sending the alternative authentication request includes sending a request for a biometric signature to the wearable computing device.

10. The computer-implemented method of claim 1, further comprising receiving the token at the wearable computing device when the wearable computing device is within a wireless network range of the mobile computing device.

11. The computer-implemented method of claim 10, wherein the wireless network range includes a Bluetooth Low Energy (BLE) network.

12. The computer-implemented method of claim 10, wherein the wireless network range includes a Near Field Communication (NFC) network.

13. A system comprising:
a mobile computing device and a wearable computing device, each comprising at least one processor and a data storage device in communication with the at least one processor, wherein the data storage device comprises instructions thereon that, when executed by the at least one processor, causes the at least one processor to:
submit, by a mobile wallet application executing at the wearable computing device of a user, an account payment transaction at a point of sale device;
send, by a financial institution application executing at the point of sale device, a transaction request message requesting authorization for the account payment transaction on an account of the user;
receive, by a mobile wallet application executing at the mobile computing device, an encrypted authentication token from a mobile wallet provider in response to the transaction request message;
send, by the mobile wallet application executing at the mobile computing device, the token to the wearable computing device;
receive, by the mobile wallet application executing at the wearable computing device, the token and forwarding the token to the mobile wallet provider; and
receive, by the financial institution application, an authorization message from the mobile wallet provider after the token is verified.

14. The system of claim 13, wherein if the wearable computing device is within a wireless network range of the mobile computing device, the wearable device receives the token.

15. The system of claim 13, wherein the mobile computing device includes a cellular telephone.

16. The system of claim 13, wherein the wearable computing device includes a smart watch.

17. A non-transitory computer-readable storage medium, the computer-readable storage medium including instructions that when executed by computers, cause the computers to perform operations of:
submitting an account payment transaction from a wearable computing device at a point of sale device;
sending a transaction request message requesting authorization for the account payment transaction on an account of a user;
receiving an encrypted authentication token at a mobile computing device from a mobile wallet provider in response to the transaction request message;
sending the token to the wearable computing device;
receiving the token and forwarding the token to the mobile wallet provider; and
receiving an authorization message from the mobile wallet provider after the token is verified.

18. The non-transitory computer-readable storage medium of claim 17, wherein the instructions further cause the computer to perform operations of:
if the token is not received, sending an alternative authentication request to the wearable computing device.

19. The non-transitory computer-readable storage medium of claim 18, wherein the sending the alternative authentication request includes sending a request for a personal identification number (PIN) to the wearable computing device.

20. The non-transitory computer-readable storage medium of claim 18, wherein the sending the alternative authentication request includes sending a request for a biometric signature to the wearable computing device.

\* \* \* \* \*